US005163714A

United States Patent [19]

Issenmann

[11] Patent Number: 5,163,714

[45] Date of Patent: Nov. 17, 1992

[54] ELECTRONICALLY-NONCONDUCTING SYSTEM FOR THE CONNECTION OF METAL TUBULAR ELEMENTS, ESPECIALLY SUITABLE FOR USE AS AN ANTENNA FRAMEWORK LOCATED AT GREAT DEPTH

[75] Inventor: Olivier Issenmann, Neuilly-sur-Seine, France

[73] Assignee:

[21] Appl. No.: 784,627

[22] Filed: Oct. 31, 1991

Related U.S. Application Data

[63] Continuation of Ser. No. 346,939, May 3, 1989, abandoned.

[30] Foreign Application Priority Data

Sep. 1, 1988 [FR] France ............................... 88 11459

[51] Int. Cl.[5] ............................................ F16L 21/00

[52] U.S. Cl. ..................................... 285/54; 285/138; 285/294; 285/915; 138/155; 166/57; 174/85

[58] Field of Search .................. 285/54, 53, 915, 138, 285/48, 294, 297, 50, 47; 138/155; 174/85; 175/320, 323; 166/57, 65.1, 242

[56] References Cited

U.S. PATENT DOCUMENTS

| | | | |
|---|---|---|---|
| 1,752,318 | 4/1930 | White | 174/85 X |
| 1,859,311 | 5/1932 | McEvoy | 285/53 |
| 1,961,762 | 6/1934 | Hinderliter | 285/332.2 |
| 3,162,806 | 12/1964 | Voetter | 285/48 X |
| 3,916,954 | 11/1975 | Hochhausen | 285/53 X |
| 4,153,656 | 5/1979 | Bunyan | 285/294 X |
| 4,674,773 | 6/1987 | Stone | 285/54 X |
| 4,692,563 | 9/1987 | Lackinger | 285/353 X |

FOREIGN PATENT DOCUMENTS

| | | | |
|---|---|---|---|
| 8202754 | 8/1982 | PCT Int'l Appl. | 285/53 |

*Primary Examiner*—Randolph A. Reese
*Assistant Examiner*—Timothy Aberle
*Attorney, Agent, or Firm*—Wenderoth, Lind & Ponack

[57] ABSTRACT

A joint for end-to-end coupling of two tubular elements includes tapered coupling surfaces on the tubular elements which are bonded together by adhesive. The coupling surfaces comprise a plurality of cylindrical sections of gradually increasing and decreasing diameters, respectively. A plurality of axially spaced-apart centering rings are interposed between the tubular elements to provide proper positioning thereof and to facilitate injection of bonding material between the coupling surfaces. A series of axially spaced-apart conducting rings forming part of an antenna surround one of the tubular elements and are insulated therefrom by a layer of bonding material. The conducting rings are separated from each other by toric joints and shims. Openings are provided in one of the tubular elements for injecting the bonding material under pressurized conditions, and an insulating sheath is bonded to inner peripheries of the tubular elements.

24 Claims, 5 Drawing Sheets

ELECTRONICALLY-NONCONDUCTING SYSTEM FOR THE CONNECTION OF METAL TUBULAR ELEMENTS, ESPECIALLY SUITABLE FOR USE AS AN ANTENNA FRAMEWORK LOCATED AT GREAT DEPTH

This application is a continuation of now abandoned application Ser. No. 07/346,939 filed on May 3, 1989.

BACKGROUND OF THE INVENTION

1. Field of the Invention

The present invention relates to an electrically-nonconducting system for the connection of metal, tubular elements.

2. Description of the Prior Art

A basic problem in providing an electrically-nonconducting connection between tubular elements is to provide such a connection that has at least the same mechanical strength as an ordinary screwed connection. This particularly is true in a drill string line. A simple screwed connection cannot easily be made electrically insulating.

It is known to attempt to provide an electrically insulating or nonconducting connection, for example in forming an antenna structure, by inserting an electrically insulating joint in a drill collar string and by providing an A.C. signal between the two sides of the joint for data telemetry. However, such attempts have not proven to be practically successful, and particularly such insulating joints have been weak points in the drill collar string.

SUMMARY OF THE INVENTION

An object of the invention is to provide an end-to-end coupling system by means of bonding of metal tubular elements, thus providing an electrically nonconducting joint having a satisfactory overall resistance to the frequently strong stresses of tension, compression, bending, and torsion, especially in the case of a very long connection piece which would have to withstand such stresses.

In a first embodiment wherein the coupling of drill collars can be used for drilling for oil, natural gas, and geothermal applications, the invention makes it possible to maintain inner and outer diametrical clearance requirements necessary for ground penetration of the drill collars and for the installation in the largest possible space within the drill collars of various devices. Such devices include parameter sensors or transmission and read-in devices for the storage, either in real time or at fixed intervals, of the parameters measured and/or recorded by the aforementioned devices.

The invention also makes it possible to impart to such an insulating joint the normal mechanical characteristics of a conventional drill collar line, including (1) resistance to tension and compression; (2) resistance to fatigue due to rotational bending; and (3) resistance to torsion.

Furthermore, when such parameters must be transmitted to the surface using an electromagnetic transmission system employing an antenna located at great depth, the invention provides for the complete electrical insulation of the tubular elements located on either side of the joint formed according to the invention.

The joint design, especially for an insulating joint in accordance with the invention, is such that its overall resistance to mechanical stress is greater than that of the weakest point existing otherwise in a drill-collar line, i.e., the screwed connection between each drill collar.

In accordance with a basic feature of the invention, the coupling between two tubular metal elements to be joined end to end is accomplished by providing opposed coupling surfaces of the two elements in the shape of a slightly-sloping frustum and the length of the joint thus formed is many times larger than the thickness of the wall of the tubular elements which are to be connected.

In practice, and in accordance with another feature of the invention, the coupling surfaces connecting the two tubular elements are formed by means of the juxtaposition of successive cylindrical steps or sections, each of which has a diameter differing only very slightly from that of the preceding cylinder.

In accordance with another feature of the invention, the joint includes a film of self-hardening adhesive interposed between the male and female coupling surfaces, respectively, provided on the ends of the tubular elements to be connected. Hardening of the adhesive can be performed under pressurized conditions to prestress or preconstrain the adhesive.

In one embodiment of the invention, the adhesive bond used is most advantageously an electrically-insulating epoxy resin designed to produce an electrically-insulating joint connecting the two successive tubular elements to be joined.

As tests have shown, one electrically-insulating bond which possesses the desired mechanical properties for the connection of metal tubular elements to be joined, is the ESP 110-type epoxy resin marketed under the registered name "PERMABOND".

BRIEF DESCRIPTION OF THE DRAWINGS

Other features and advantages of the invention will be evident from the following description in which reference is made to the annexed drawings which illustrate schematically and only as an example a preferred embodiment of the joint perfected in accordance with the invention, and wherein.

DETAILED DESCRIPTION OF THE PREFERRED EMBODIMENTS

In the attached drawings, and in order to be able to show the various details of a joint according to the invention on a usable scale, the joint has been subdivided along its length into several sections, which have been designated individually by the reference numbers 1-8. In practice, this joint has a length of about fifty centimeters to approximately one meter.

Figure 1A:
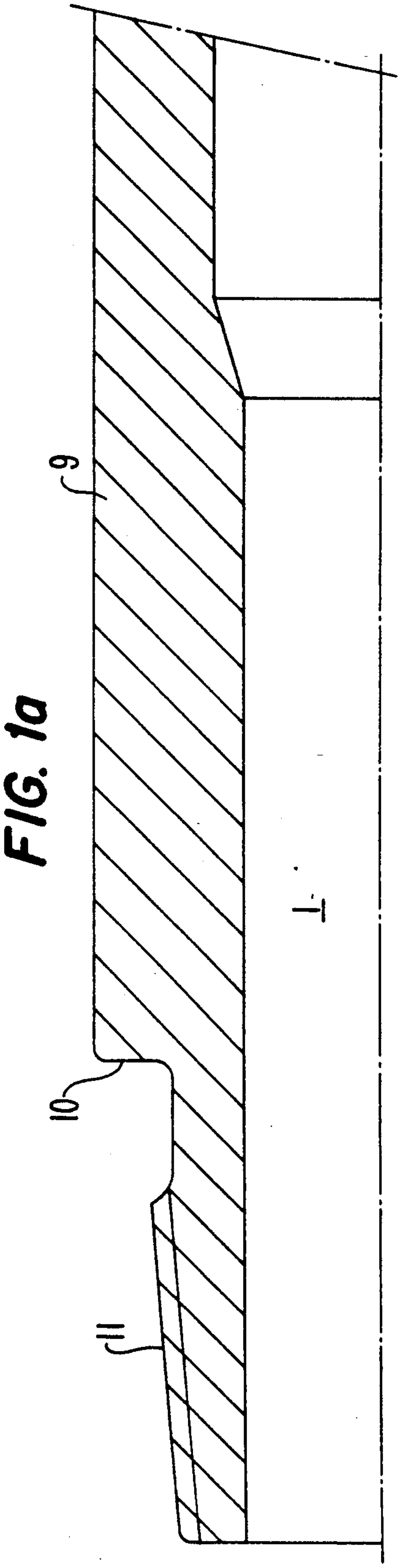
FIG. 1*a* is a longitudinal sectional view of a first section of a tubular coupling, showing a male part equipped with an external screw thread for connection with a female end piece of an adjoining tube (not shown) to be joined.
Figure 1B:
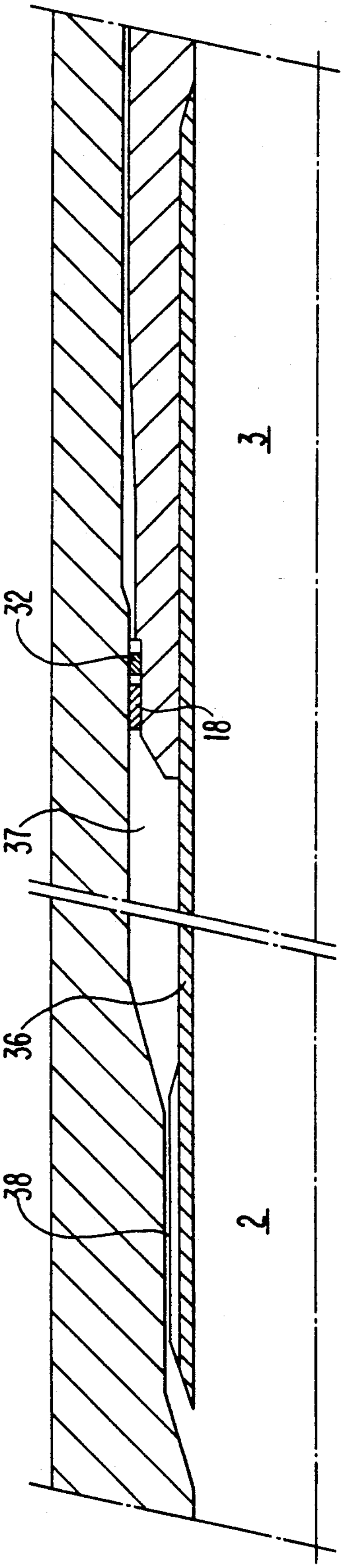
FIG. 1*b* is a longitudinal sectional view of the next section of the tubular joint.
Figure 1C:
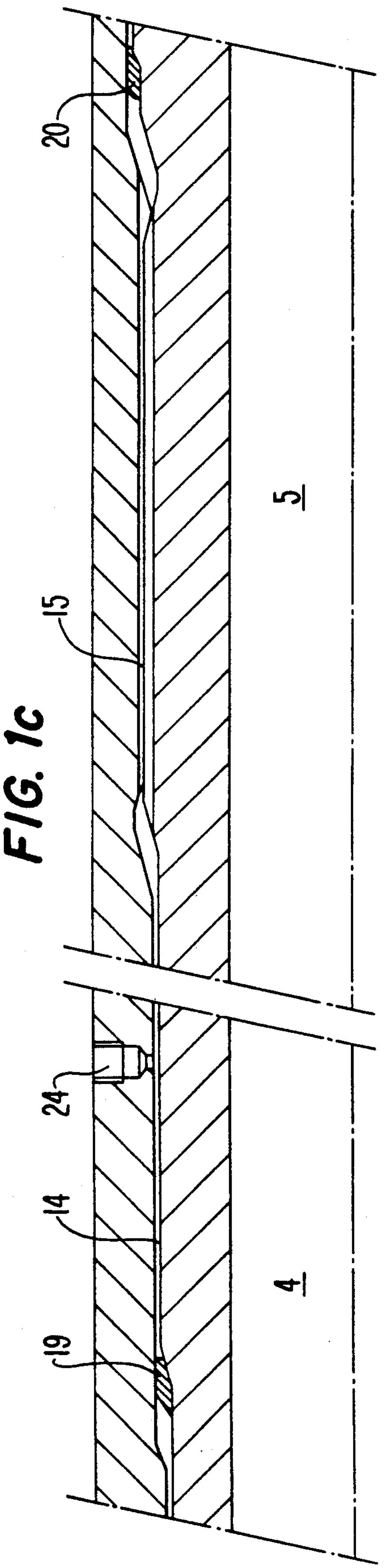
FIG. 1*c* is a longitudinal sectional view of the section immediately following the tubular section shown in FIG. 1*b;*

FIG. 1*a* shows a tubular element to be joined, which, for example, can be a drill collar of the type used in the petroleum industry. The male end 9 of this drill collar has a shoulder 10 beyond which extends a slightly conical exterior thread 11. The other end of the drill collar, best illustrated on the right side of FIG. 1*e*, includes an internally flared portion 12 which is threaded at 13 and in which is screwed a corresponding male end of an adjoining metal tube (not shown) to be connected thereto.

An assembly for uniting two tubular elements by means of a joint in accordance with the invention is achieved by using a pair of truncated coupling surfaces which are actually formed using a series of axially spaced-apart cylindrical sections or steps 14-17 having increasing diameters for the female part, and decreasing diameters for the male part, with only a minimal difference in diameter characterizing opposed cylindrical sections. A tapered section is provided between adjacent pairs of cylindrical sections.

The coupling of the two slightly-sloping coupling surfaces, one of which is formed at the lower end of a first tube to be joined and the other on the corresponding upper end of a second tube to be joined to the first, is achieved by means of a tapered fit therebetween due to the shape of the coupling surfaces, each having the shape of a frustum having a slight inclination, and the length of the joint is a high multiple of the thickness of the wall of the tubes to be connected.

In order to render the joint perfectly resistant to mechanical stresses, connection is ensured by gluing, and in particular, by the spreading of a thin layer of adhesive or glue between the two frustums, one inserted into the other.

In order to ensure complete resistance to the stresses of tension, torsion, bending, and/or buckling which occur between the two joined elements, it is desirable to form the joint using an epoxy resin.

Furthermore, to achieve an electrically-nonconducting connection of the two tubular elements in the desired fashion, it appears that it is most advantageous to use an ESP 110-type epoxy resin marketed under the tradename "PERMABOND". In general, a "PERMABOND" type adhesive comprises a cyanoacrylate adhesive, which is a rapid setting and strong bonding adhesive cement.

To ensure proper centering of the frustums joining the two tubular elements to be connected, the invention calls for the graduated cylindrical coupling surfaces with tapered sections therebetween (which are to be bonded together by gluing) to be held in the correct axial position by arranging inserts comprising plastic centering rings 18-23 between opposed cylindrical sections and preferably at axially spaced locations between opposed tapered sections.

The joint in accordance with the invention achieves particularly good results if the insulating centering rings are made of a material sold under the trademark "RITON" (trademark of the Du Pont de Nemours Company). The rings can be rectangular in cross section as shown by the rings 18 and 21 in FIGS. 1*b* and 1*d* or the rings can include at least one tapered axial end surface as shown by the rings 19 and 22 in FIGS. 1*c* and 1*d*.

In order to correctly place the epoxy resin (serving as the connecting bond in the joint) between the opposing truncated elements, at least one opening 24-27 for injection of adhesive is provided in the wall of at least one of the tubes to be joined. These openings also permit a vacuum to be applied to the space between the coupling surfaces so that the bonding material can be injected and compressed. To facilitate the application of the adhesive, the bonding material is most advantageously injected at a pressure of 300 bars, whereby a prestress can be applied to the epoxy bonding material during the entire length of the polymerization procedure. The prestress is intended to prevent any subsequent penetration of liquid from the shaft into possible cracks in the bonding material when the interconnected tubular elements are lowered in a drilling shaft where a pressure lower than 300 bars exists.

When it is necessary for the coupling of the tubular elements to be electrically nonconducting, as in the case when the coupling is to be used as an antenna structure for electromagnetic transmission of parameter recording signals, the centering rings 18-23 can most advantageously be made of a nonconducting plastic material. Furthermore, each of the centering rings can be subdivided into two half-rings which have a circumferential length which is less than that of a half-circle to allow the best passage of the bonding material when it is injected.

Figure 1D:
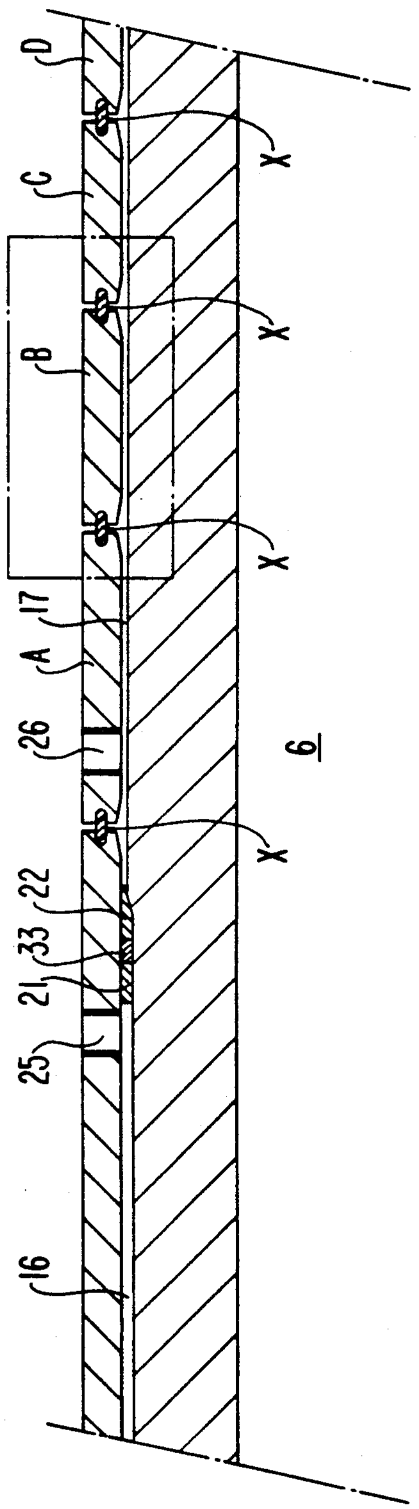
FIG. 1*d* is a longitudinal sectional view of the section immediately following the tubular section shown in FIG. 1*c;*
Figure 1E:
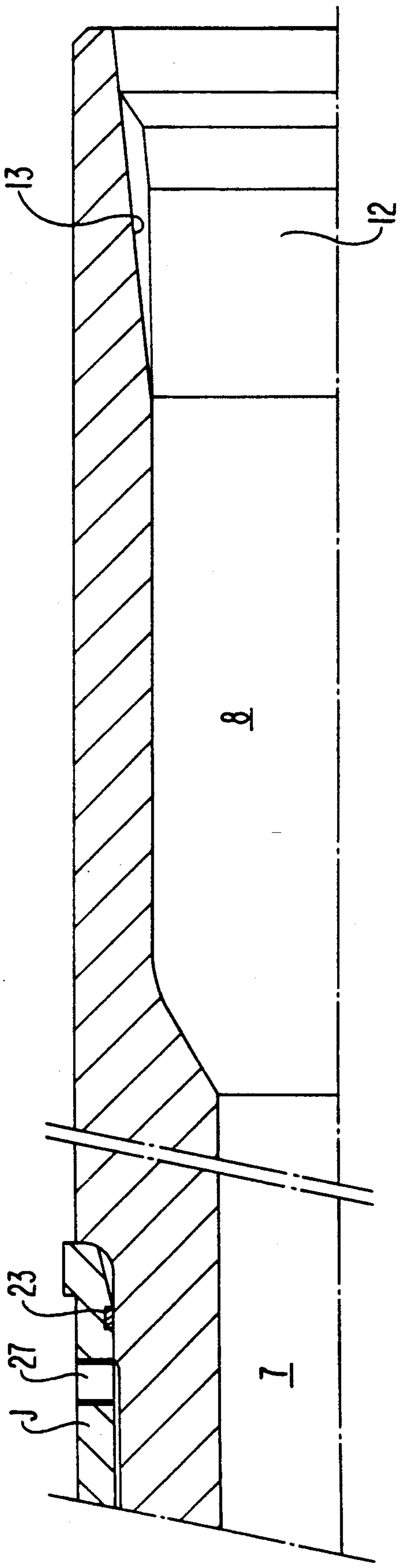
FIG. 1*e* is a longitudinal sectional view of the last tubular section, at the level of the maximum flaring of the truncated surface.
Figure 2:
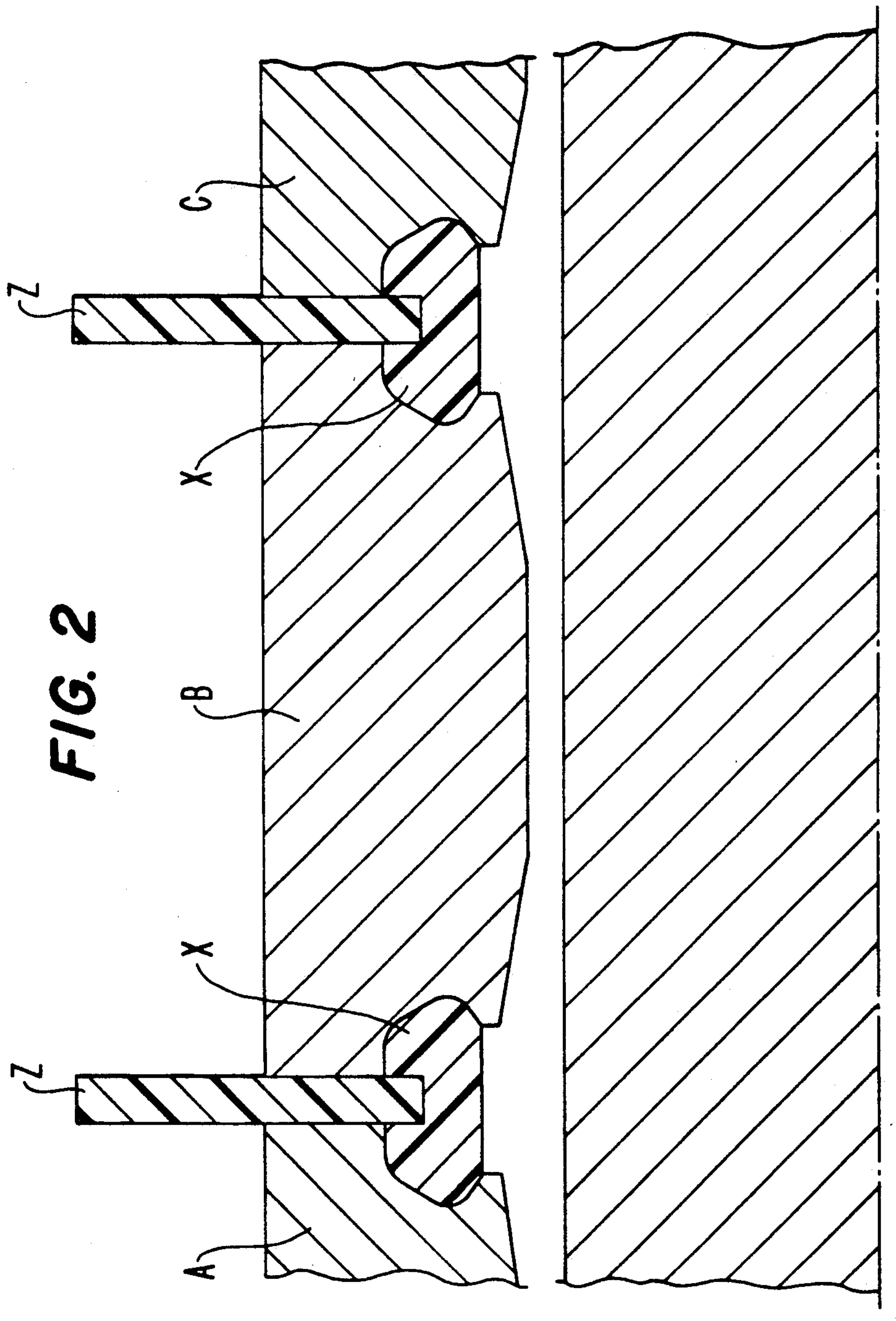
FIG. 2 is a longitudinal, axial sectional view, on a very enlarged scale, of the section of the joint enclosed in the box shown in FIG. 1*d;*
Figure 3:
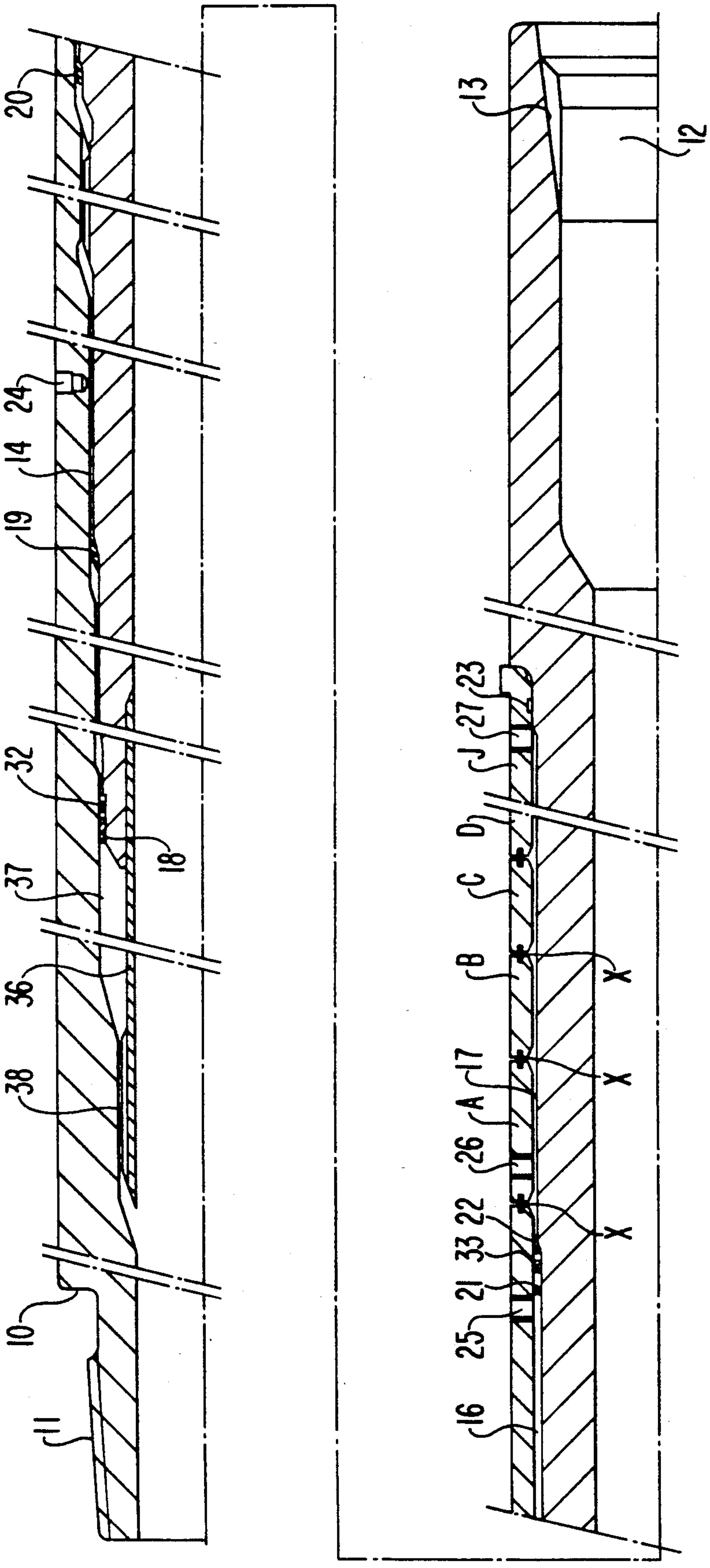
FIG. 3 is a longitudinal sectional view of the entire tubular coupling illustrating all the sections of FIGS. 1*a*–1*e.*

In the case of a series of drill collars wherein the electrically nonconducting coupling acts as a component of an antenna system for the transmission of parameters, the end of the female portion of the connection to the right of a first joint X is divided into electrically conducting, i.e. metal, rings A, B, C, D . . . J, as shown in FIG. 1*d*. FIG. 2 shows another joint X between two adjacent conducting rings, the joint X comprising an elastomer of a generally trapezoidal shape.

A method of injecting the bonding material occurs in two steps. In the first step, injection takes place in the space located between the centering rings 18 and 21 using the openings 24 and 25 as the inlet and the outlet, respectively, for the injected bonding material. Toric joints 32 and 33 are provided at the extremities of the space contained between rings 18 and 21, to ensure watertightness of the interstitial volume thus delimited. In the second step, the epoxy resin is injected into the space formed under the conducting rings, by using the openings 26 and 27 as the inlet and outlet, respectively, for the injected bonding material.

In FIG. 2, which is a large-scale view of the portion of the connection enclosed in the chain line box shown in FIG. 1*d*, it can be seen that the conducting rings A, B, and C are electrically insulated from each other and from the mass of the tube by the combination of the injected bonding material and the specially configured toric joints X.

As shown in FIG. 2, each joint X comprises a connecting ring of electrically insulating material having a cross-section taken in a plane passing through the central axis of the tube which is generally trapezoidal in shape, with a radially innermost surface thereof being axially longer than and parallel to a radially outermost surface thereof, the innermost and outermost surfaces also being parallel to the central axis. The outermost and innermost surfaces of the connecting ring X are connected by a pair of axially spaced-apart curved end surfaces, each of which comprises a longer outer straight portion, a shorter inner linear portion and a curved portion therebetween. Each of the straight portions extends radially inwardly from the outermost surface at an obtuse angle thereto such that both of the straight portions are located closer together at the outermost surface. Each of the linear portions extends radially outwardly from the innermost surface at an obtuse angle thereto such that both of the linear portions are located closer together at the innermost surface. Each of the curved portions is joined to the corresponding straight portion at a point located closer to the innermost surface than to the outermost surface, and the curvature of the curved portion is such that the straight and linear portions are substantially tangent to the curved portion. Each axial end of each of the conducting rings includes a circumferentially extending slot having a shape matching a respective one of the curved end surfaces of the joints X, and the radially innermost surface of each conducting ring is tapered radially outwardly at the opposite axial ends thereof. Each of these joints X has a circumferentially extending outer peripheral groove which receives a radially extending disk-shaped shim Z. These shims Z ensure that a desired spacing (approximately 1.5 mm) is maintained between the conducting rings.

During the injection of the bonding material under the conducting rings, the joints X between the conducting rings (which provide watertightness) are held in position by the shims Z clamped between adjacent conducting rings. The shims are initially positioned in the grooves such that they project radially beyond the external peripheral surface of the device, but after hardening of the bonding material the shims are made flush with the outer cylindrical surface of the device.

The electrical insulation provided by the centering rings, each of which has a width of approximately 6 cm, is supplemented inside the tubes 1–8 by a cylindrical tube or sheath 36 made of an insulating material and having a length of at least 50 cm. The sheath 36 is glued at one end to the interior periphery of one end of upper male piece, and at the other end to the interior periphery of the female piece. A space 37 located radially outwardly of the insulating cylindrical sheath 36 and axially between the male and female pieces is filled with a hardenable liquid elastomer which is most advantageously injected through a small axially extending channel 38 between the female piece and the sheath 36 after the previously discussed bonding steps.

The invention has been described and illustrated solely for the purpose of explanation thereof by way of a non-limitative example, but various changes and modifications can be made to the specific embodiments described and which are intended to fall within the scope of the appended claims. For instance, the number of graduated cylindrical sections could be different from the number shown, and the length of these cylindrical sections could be larger or smaller, according to the number used. Similarly, the number and width of the conducting rings, such as A, B, C, D . . . J, could also be different from the example specifically shown in the drawings.

I claim:

1. A coupling joint, comprising:

a first substantially tubular element having first and second opposite ends and a predetermined length between said opposite ends, said first substantially tubular element having an inner annular wall comprising a first coupling surface having the form of a gradually sloping frustum extending over the majority of said length of said first element and expanding toward and ending at said second end of said first element, wherein said first end of said first element comprises first connecting means for connecting said first substantially tubular element to another element; and a second substantially tubular element having first and second opposite ends and a predetermined length therebetween, said second substantially tubular element having an outer annular wall comprising a second coupling surface having the form of a gradually sloping frustum contracting towards and ending at said first end of said second element and extending over the majority of said length of said second substantially tubular element for operative coupling engagement with said first coupling surface, wherein said first and second coupling surfaces have substantially the same length, and wherein said second end of said second element comprises second connecting means for connecting said second substantially tubular element to yet another element;

wherein said coupling surfaces can thus be mated together in a coaxial mating relation.

2. A joint as in claim 1, wherein said coupling surfaces are in concentrically spaced coaxial relation, thereby forming an annular frustum space therebetween, and further comprising a self-hardening bonding material filling said space and bonding said elements together.

3. A joint as in claim 2, wherein said bonding material is an electrically non-conducting epoxy resin.

4. A joint as in claim 3, wherein said epoxy resin comprises a cyanoacrylate adhesive.

5. A joint as in claim 2, wherein at least one of said elements includes means for permitting injection of said bonding material into said space.

6. A joint as in claim 2, wherein each of said coupling surfaces includes a plurality of longitudinally axially aligned cylindrical sections, the diameters of said cylindrical sections increasing in the longitudinal direction towards said end of said first element, said cylindrical sections thereby defining said frustums, each of said coupling surfaces further comprising annular tapered sections extending between adjacent ones of said cylindrical sections, and further comprising a plurality of centering rings, said rings being disposed within said space at longitudinally spaced positions and abutting said coupling surfaces, and at least one of said rings having a tapered end surface mating with one of said tapered sections.

7. A joint as in claim 6, further comprising an insulating tube extending from said end of said second element in the longitudinal direction away from said end of said first element.

8. A joint as in claim 1, wherein said coupling surfaces are in concentrically spaced coaxial relation, thereby forming an annular frustum space therebetween, and further comprising at least one centering ring, said ring being disposed within said space and abutting said coupling surfaces.

9. A joint as in claim 1, wherein said coupling surfaces are unthreaded surfaces.

10. The coupling joint of claim 1, wherein said first and second connecting means both comprise threads.

11. The coupling joint of claim 10, wherein said threads of said first connecting means are coaxially tapered and on the outer annular wall of said first element, and said threads of said second connecting means are flared and on the inner annular wall of said second element.

12. A coupling joint, comprising:

a first substantially tubular element, said first element having a length and a portion of the inner annular wall of said first element comprises a first coupling surface having the form of a gradually sloping frustum expanding towards and ending at an end of said element; and a second substantially tubular element, said second element having a length and a portion of the outer annular wall of said second element comprises a second coupling surface having the form of a gradually sloping frustum contracting towards and ending at an end of said second element, each of said coupling surfaces extending over the majority of the respective lengths of said elements and being in coaxial mating relation together;

wherein each of said coupling surfaces includes a plurality of longitudinally axially aligned cylindrical sections, the diameters of said cylindrical sections increasing in the longitudinal direction towards said end of said first element, said cylindrical sections thereby defining said frustums.

13. A coupling joint, comprising:

a first substantially tubular element, said first element having a length and a portion of the inner annular wall of said first element comprises a first coupling surface having the form of a gradually sloping frustum expanding towards and ending at an end of said element; and a second substantially tubular element, said second element having a length and a portion of the outer annular wall of said second element comprises a second coupling surface having the form of a gradually sloping frustum contracting towards and ending at an end of said second element, each of said coupling surfaces extending over the majority of the respective lengths of said elements and being in coaxial mating relation together;

wherein said coupling surfaces are in concentrically spaced coaxial relation, thereby forming an annular frustum space therebetween, and further comprising at least one centering ring, said ring being disposed within said space and abutting said coupling surfaces; and wherein each said at least one centering ring comprises a plurality of semi-annular ring segments, each said plurality of ring segments being formed of an electrically insulating material and having a combined circumferential extent which is less than the circumference of said space at the position at which said ring is disposed.

14. A coupling joint, comprising:

a first substantially tubular element, said first element having a length and a portion of the inner annular wall of said first element comprises a first coupling surface having the form of a gradually sloping frustum expanding towards and ending at an end of said element; and a second substantially tubular element, said second element having a length and a portion of the outer annular wall of said second element comprises a second coupling surface having the form of a gradually sloping frustum contracting towards and ending at an end of said second element, each of said coupling surfaces extending over the majority of the respective lengths of said elements and being in coaxial mating relation together;

wherein a segment of one of said elements, said segment including said frustum, comprises a series of longitudinally-aligned conducting rings, said conducting rings being electrically insulating from each other and from the remainder of said one of said elements, and wherein said coupling surfaces are in concentrically spaced coaxial relation, thereby forming an annular frustum space therebetween, and further comprising an electrically non-conducting material fitting said space and bonding said elements together.

15. A coupling joint, comprising:

a first tubular element, a portion of the inner annular wall of said first tubular element forming a first coupling surface;

a second tubular element, a portion of the outer annular wall of said second tubular element forming a second coupling surface, said coupling surfaces being bonded together and electrically insulated from each other over a longitudinal distance greater than approximately 50 cm;

wherein one of said tubular elements comprises a segment and a remaining portion thereof, said segment including said coupling surface of said one of said tubular elements and comprising a series of longitudinally spaced conducting rings;

electrically non-conductive means, said means being disposed between adjacent said conducting rings, and said means also being disposed between said remaining portion of said one of said elements and an adjacent said conducting ring of said segment; and an insulating tube disposed within both said elements, a portion of said tube being mounted to said second element near an end of said element.

16. A joint as in claim 15, wherein said coupling surfaces are in concentrically spaced coaxial relation, thereby forming a space therebetween, and further comprising a prestressed bonding material disposed in said space to bond said elements together.

17. A joint as in claim 15, wherein said electrically non-conductive means comprises joints between adjacent said conducting rings.

18. A joint as in claim 17, and further comprising a shim extending radially outward from a peripheral groove in each of said joints and disposed between adjacent ones of said conducting rings.

19. A joint as in claim 17, further comprising a shim extending radially outward from each of said joints and disposed between adjacent ones of said conducting rings.

20. A joint as in claim 19, wherein each of said joints between said rings comprises a connecting ring having a generally trapezoidal shape in a cross-sectional plane which includes a longitudinal axis of said elements, portions of each of said connecting rings being mounted in complimentary grooves in said conducting rings.

21. A joint as in claim 15, wherein said insulating tube is bonded to said first element, said insulating tube being longitudinally spaced from said conducting rings.

22. A joint as in claim 21, wherein said coupling surfaces have the form of gradually sloping mating frustrums in concentrically spaced coaxial relation, thereby forming a space therebetween, and further comprising a bonding material disposed in said space to bond said elements together.

23. A joint as in claim 22, further comprising at least one centering ring, said ring being disposed within said space and abutting said coupling surfaces.

24. A joint as in claim 15, wherein said coupling surfaces are unthreaded surfaces.

* * * * *

UNITED STATES PATENT AND TRADEMARK OFFICE
CERTIFICATE OF CORRECTION

PATENT NO. : 5,163,714

DATED : November 17, 1992

INVENTOR(S) : Olivier Issenmann

It is certified that error appears in the above-identified patent and that said Letters Patent is hereby corrected as shown below:

ON THE TITLE PAGE: Item [73] should read

--GEOSERVICES, Cedex, France--.

Signed and Sealed this

Fourth Day of May, 1993

Attest:

Michael K. Kirk

MICHAEL K. KIRK

*Attesting Officer* *Acting Commissioner of Patents and Trademarks*